Patented Aug. 7, 1945

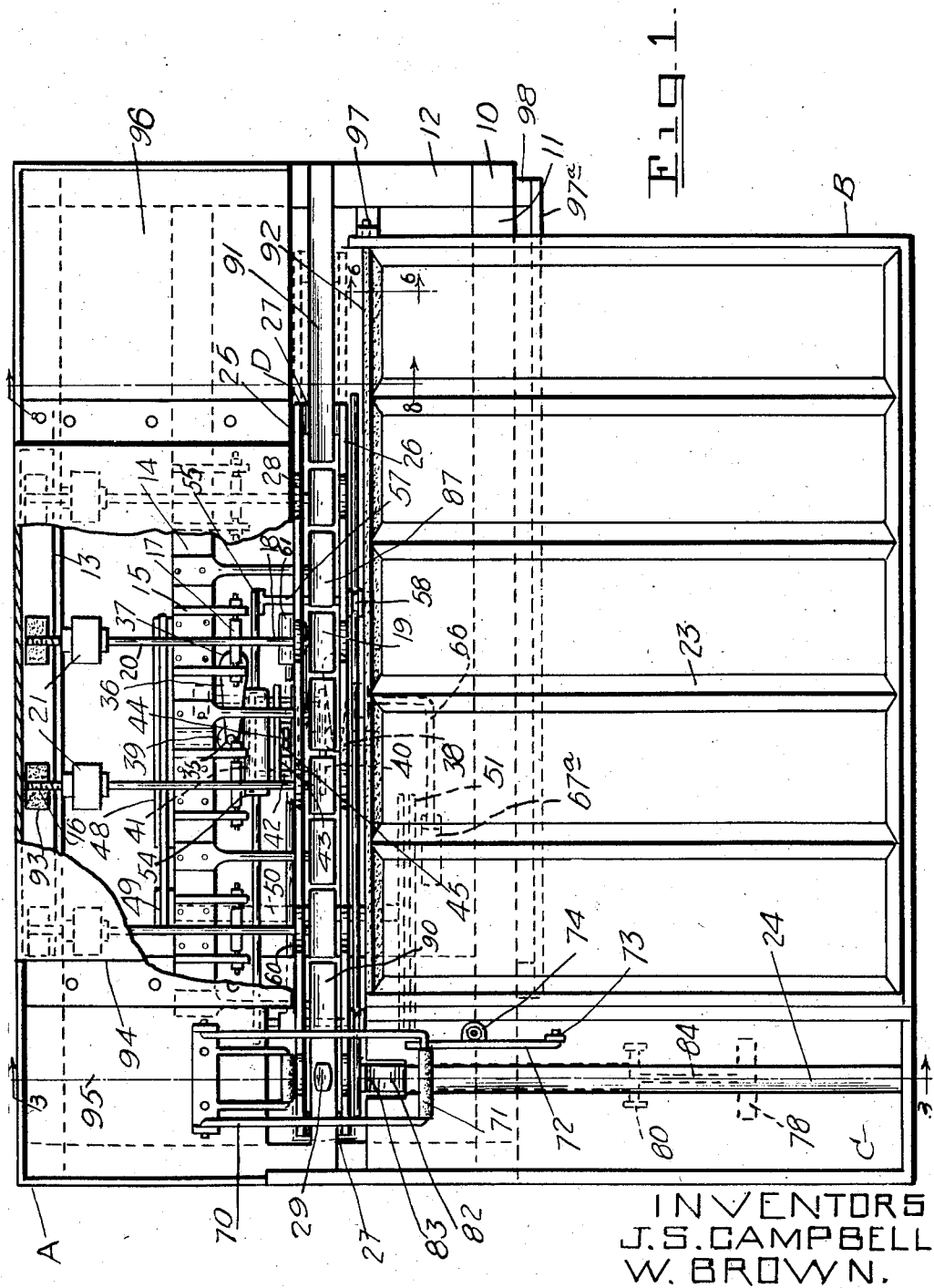

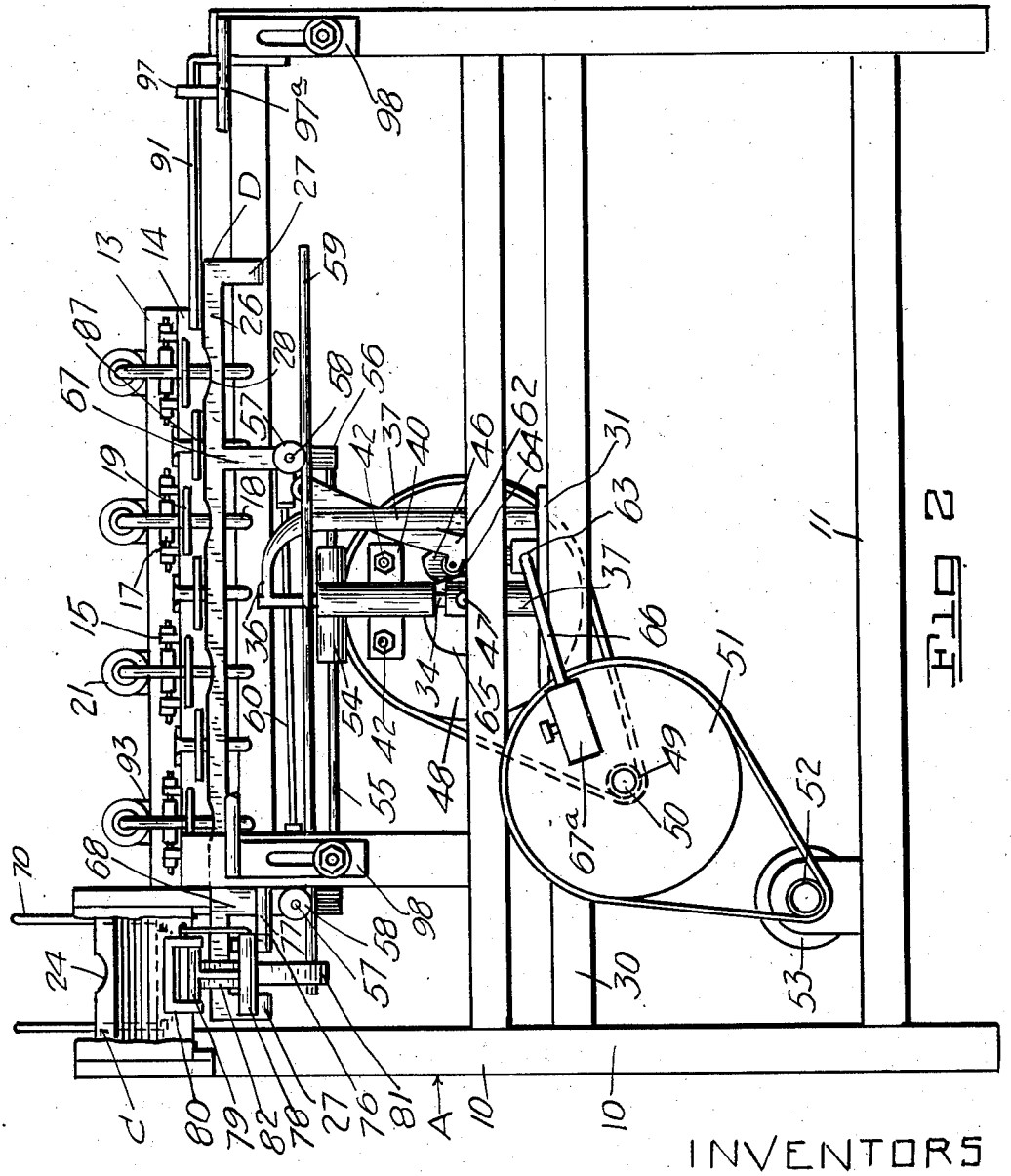

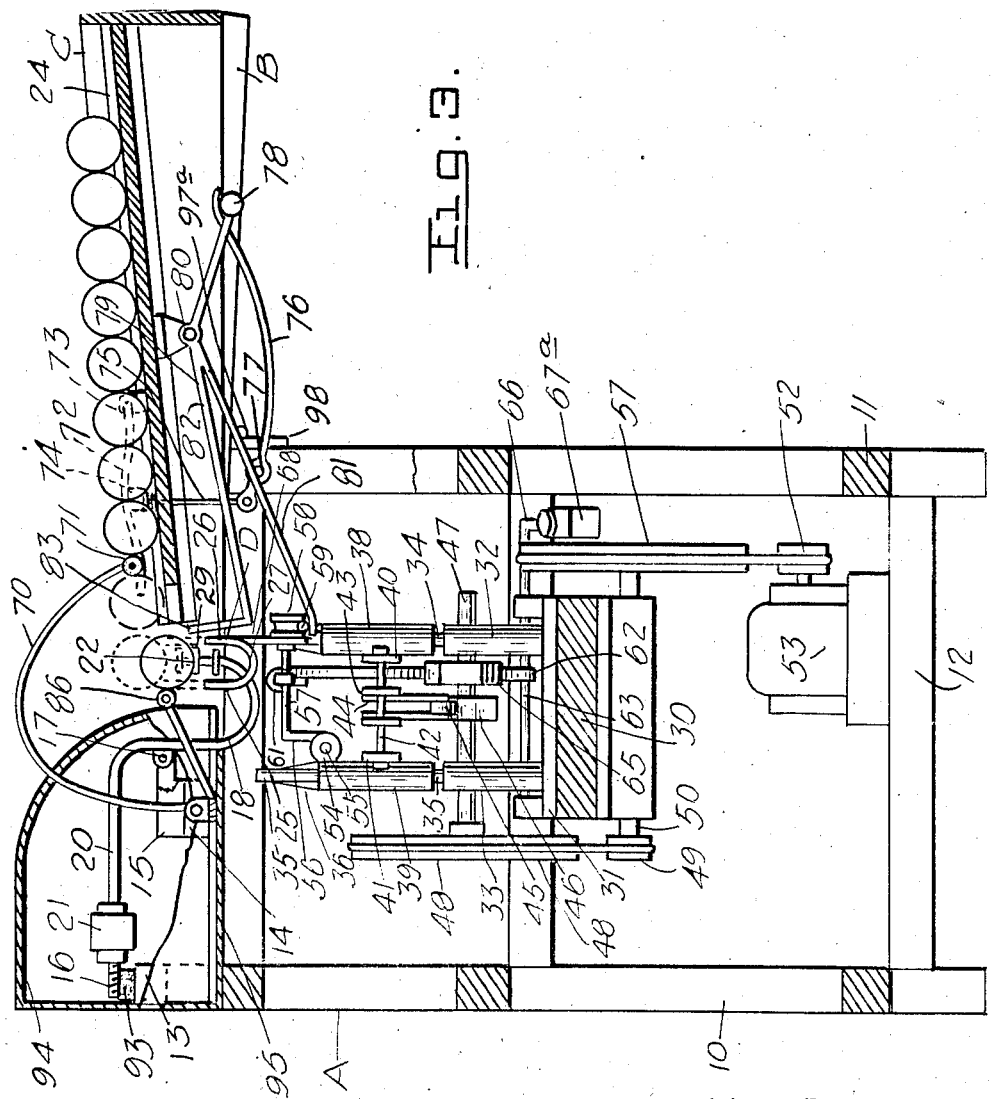

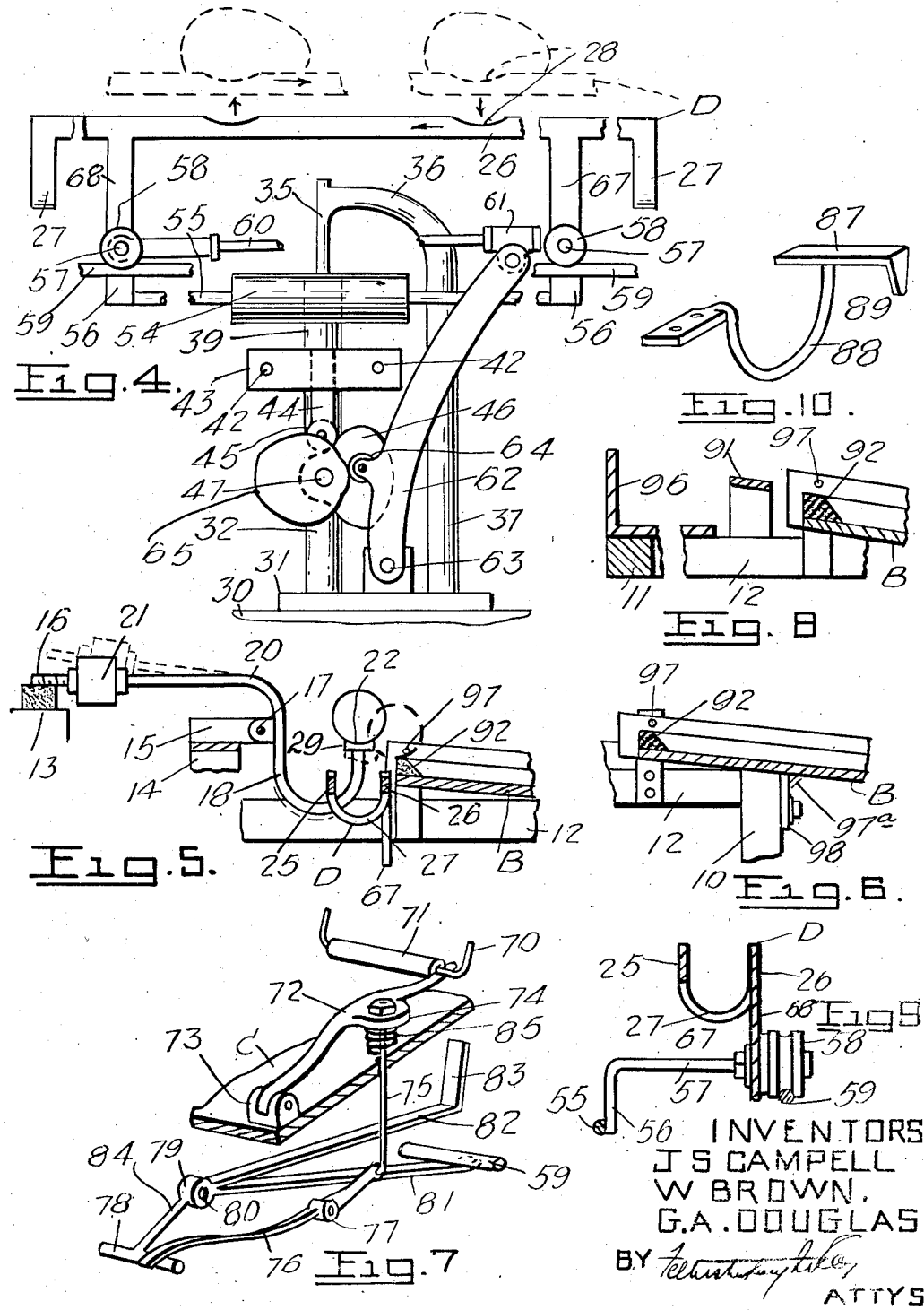

2,381,035

UNITED STATES PATENT OFFICE 2,381,035

EGG GRADING MACHINE

John Stewart Campbell and William Brown, Melbourne, and George Alexander Douglas, Mount Brydges, Ontario, Canada Application December 8, 1942, Serial No. 468,230

9 Claims. (Cl. 209—121)

This invention relates to grading machines, particularly egg grading machines.

It has been the practice to grade eggs by weighing them and egg grading machines employing a plurality of scales upon which the eggs are progressively placed and discharged from a given scale have been employed. In one type of machine swingable jaws have been used to grasp eggs and lift them from scale to scale, while in another type of machine fingers have been employed to carry the eggs and designed to pass through spaced apart fingers forming scale pans in order to deposit the eggs on the pans.

In the first type of structure there are several disadvantages which include, the tendency towards breakage of the eggs by the swinging jaws particularly in the case where the eggs gather to any extent on the trays into which they are discharged, as the swinging jaws operating through an arc to engage the eggs on the scale pans move closely to a portion of the trays. Furthermore, this type of structure is relatively noisy in operation. In the second case a particular disadvantage resides in the fact that if the timing of the apparatus should vary in any one instance or if movable parts should be moved slightly out of position the fingers carrying the eggs will not pass between the fingers of the scale pans but would tend to contact with the fingers of the scale pans, thus jambing or possibly breaking the apparatus and/or breaking eggs.

It is particularly desirable in apparatus of this general type to provide a structure which will reduce to the very minimum any possibility of egg breakage as when compared with the large volume of eggs handled any material breakage will result in a substantial loss.

It is an object of the present invention to produce a machine which will avoid the general disadvantages of the prior art by providing against breakage in the handling of the eggs as they pass through the machine and even though machine parts might in any instance be moved from normal operating position.

A further object of the invention is to provide a structure which will operate smoothly and practically silently.

A still further object of the invention is to provide a structure in which eggs that might be dislodged from normal position while passing through the machine will be gently handled and deposited at a given point to be collected and passed through the machine again.

A still further object of the invention is to provide a machine which is relatively simple in a general construction and may be manufactured and marketed at a reasonable figure.

With these and other objects in view the invention generally comprises a frame carrying a plurality of scales spaced apart from one another and each having a scale pan aligned with that of the adjacent scales which cooperate with egg carrying means transferring eggs from pan to pan including a pair of members disposed to straddle the pans and movable in horizontal and vertical direction relatively to the pans. The structure includes a means cooperating with the egg carrying members to receive and pass through the machine, eggs that might become misplaced in the carrying operation, in which said eggs are handled without tendency to breakage and a means for preliminarily contacting the eggs as they are discharged from the pans to the trays to assure against breakage. The machine also includes a simple means for feeding the eggs to the egg carrying members smoothly and silently.

The invention will be understood by reference to the following detailed specification taken in conjunction with the accompanying drawings.

In the drawings:

Fig. 1 is a top plan view of a machine according to the present invention.

Fig. 2 is a front elevation thereof with the egg receiving tray removed for the purpose of clarity of disclosure, the forward support of the tray being shown fragmentarily.

Fig. 3 is a transverse section taken through the machine along the line 3—3 of Fig. 1.

Fig. 4 is an enlarged front elevation of the egg carrying members and the apparatus connected therewith for causing their operation.

Fig. 5 is an enlarged fragmentary section taken through the machine at a point where a scale is mounted to show its relative position in the machine and its movement in depositing an egg onto the receiving tray.

Fig. 6 is an enlarged fragmentary section taken through the machine to show the mounting of the egg receiving tray.

Fig. 7 is an enlarged perspective detail partly in section to illustrate the means for feeding the eggs to the egg carrying members.

Fig. 8 is an enlarged section taken along the line 8—8 of Fig. 1 to illustrate the means for discharging the lightest eggs and part of the tray for receiving eggs that might have been dislodged while passing through the machine.

Fig. 9 is an enlarged detail partly in section showing the mounting of the egg carrier.

Fig. 10 is an enlarged perspective detail of a guard rigidly mounted on the frame between certain scale pans and in alignment therewith.

Referring to the drawings, A indicates the egg grading machine as a whole which includes a suitable framework made up of uprights 10 longitudinal connecting members 11 and transverse connecting members 12. At the top of the framework a pair of longitudinally extending connecting members 13 and 14 are spaced apart transversely of the framework. Member 14 carries a plurality of arms or the like 15 between pairs of which scale beams 16 are pivotally mounted on a pivot bar 17 (see Fig. 1 particularly).

The scale beams take the form of a bent arm having a gooseneck portion 18 which terminates in a scale pan 19. The opposite end takes the form of a laterally projecting arm 20 which carries, preferably in screw-threaded relation, an adjustable weight 21 (see Fig. 5 particularly). The scale pans, as will be seen from Figs. 1 and 5, are long and narrow and the upper face thereof is concaved as at 22 such that when an egg is deposited thereon it will retain it unless the scale pan moves downwardly in the case where the beam is tilted by an egg heavy enough to do so.

As seen in Fig. 1 a plurality of scale pans are mounted so that they are aligned with one another and extend in a path longitudinally across the machine. The scale pans are spaced apart from one another longitudinally of the machine, each pan being disposed opposite to a compartment formed between partitions 23 of an inclined egg receiving tray B whose inner edge is positioned adjacent to and parallel with the line of scale pans. The tray B is swingably mounted on the framework in a manner hereinafter referred to and slopes downwardly from its inner end adjacent the pans to its outer end. Thus, when eggs are transferred onto the scale pans and cause any one of the pans to tip downwardly, where the egg in question is heavy enough to cause this action, the egg will be deposited in one of the compartments of the egg tray and will roll towards the outer end thereof.

Beside the egg tray B is positioned an inwardly and downwardly sloped egg chute C which is preferably formed with a groove or trough 24 along which the eggs may roll, the slope of the egg chute being in the opposite direction to the slope of the egg tray. The eggs are caused to roll down the egg chute intermittently as will hereinafter appear and the innermost egg discharges from the inner end of the egg chute and is finally received by an egg carrier D which is in the form of a longitudinally extending member designed to straddle the line of scale pans and is caused to reciprocate longitudinally of the machine and to move vertically upwardly and downwardly, in order to transfer eggs from scale pan to scale pan.

The preferred form of egg carrier may be best seen by reference to Figs. 4 and 5. This consists of a pair of longitudinal bars 25 and 26 spaced apart from one another transversely of the machine and connected together by integral or attached U-shaped members 27 at each end. The bars are recessed as at 28 at spaced apart intervals longitudinally of the carrier and at points which coincide with the centres of the scale pans 19, the corresponding recesses in each bar forming means for jointly receiving an egg between them and holding it against movement. As particularly noted from Fig. 5, the bars 25 and 26 are spaced apart a distance so as to permit them to straddle the scale pans and at the same time to support therebetween an egg.

As may be noted from Fig. 1 the egg carrier D, in its normal position, is arranged such that an egg receiving recessed portion is disposed opposite to the egg chute 24 while a corresponding egg receiving recessed portion is disposed beside each scale pan 19. Thus, if an egg is discharged from the end of the egg chute 24 it will be received on a concave egg receiving pedestal 29 which is disposed between the bars 25 and 26 of the egg carrier D, and if the egg carrier is then raised the egg will be engaged by the first egg receiving portion of the egg carrier D which would lift it off the pedestal 29. Moreover, if the egg carrier is then moved longitudinally of the machine a predetermined distance, such egg will be disposed to register with the first scale pan, and, upon lowering the egg carrier D, such egg would be deposited on the first scale pan. Following this when the egg is engaged by the first scale pan upon the lowering of the egg carrier D, if the latter is then moved to the left longitudinally of the machine the first egg receiving recessed portion thereof would be again positioned alongside of the egg pedestal 28 and opposite to the chute 24. By repeating this reciprocation of the egg carrier in between upward and downward motions of the egg carrier at the end of each longitudinal stroke, eggs are received in the machine and transferred from scale to scale pan to be weighed and discharged in accordance with their weight as will be described in more detail hereinafter.

The egg carrier is mounted and operated as follows: Mounted between corresponding cross members 12 at each end of the frame is a platform 30 designed to support a base plate 31 carrying a pair of upright standards 32 and 33 (Fig. 3) mounted parallel to one another and spaced apart transversely of the machine. From these standards rise the guide rods 34 and 35 which at the top are braced by means of a connecting bar 36 (see Fig. 4) which may constitute the bent end of a bracing standard 37. The bracing bar 36 of each standard 37 is preferably welded respectively to the associated guide rods 34 and 35.

On the guide rods 34 and 35 are mounted slidable sleeves 38 and 39 respectively. To the sleeves 38 and 39 are secured the horizontally extending cross plates 40 and 41 (see Figs. 2 and 3) connected by the cross rods 42 to form a framework and between the plates 40 and 41; mounted parallel therewith on the rods 42, are spaced apart plates 43 from the centre of which depend the downwardly projecting arms 44 spaced apart from one another and carrying therebetween at their lower ends a cam roller 45. This is designed to engage the surface of the cam 46 carried on the cam shaft 47 mounted from the standards 32 and 33 and rotated by a drive which includes pulleys 48 and 49, cross shaft 50, pulleys 51 and 52, the latter being driven from a motor 53, the pulley arrangement being such as to provide an appropriate speed of operation. Rotation of the cam shaft 47 will cause cam 46 to rotate in bearing engagement with the roller 45 and due to the cam rise, later more specifically referred to, the depending arms 44 and other connections including the plates 40 and 41 connected to the sleeves 38 and 39 will cause them to rise upwardly and downwardly, with the motion of the cam, sliding upon the guide rods 34 and 35.

As noted in Figs. 3 and 4 particularly, the sleeve 39 has connected thereto a horizontally disposed sleeve 54 which, of course, moves vertically upwardly and downwardly with the corresponding motion of sleeve 39. Passing through this sleeve is a horizontally extending rod 55, at each end of which is secured a connecting member 56 (see Fig. 9) rising vertically therefrom and carrying at its upward end a horizontal rod 57 having a roller 58 mounted on its opposite end. The sleeve 38 has welded thereto, or otherwise suitably secured, a horizontal bar 59 (see Figs. 2 and 4) which is disposed at a slightly higher level to the horizontal sleeve 54 carried by the sleeve 39. The rod 59 is designed to receive the rollers 58 in bearing engagement and one of its functions is to form a track for these rollers to ride on.

Connected to the rods 57 is a longitudinally extending link rod 60 which in turn is pivotally connected as at 61 with a lever arm 62, the latter being pivoted on the base 31 as at 63. Intermediate the ends of the lever 62 is mounted a cam roller 64 designed to ride on the cam face of a cam 65 mounted on the cam shaft 47 beside cam 46. The pivotal mounting 63 of the lever 62 includes a transverse rod connected with or forming part of a weighted lever arm 66 carrying an adjustable weight 67a, the lever arm 66 being disposed to project at an angle to lever 62. This weighted lever arm, therefore, has the tendency of always urging lever 62 to the left, as viewed in Figs. 2 and 4, thus to maintain the roller 64 in engagement with cam 65. Consequently upon rotation of the cam the cam rise will cause lever 62 to reciprocate which will result in link rod 60 reciprocating and thus reciprocate the rods 57, the rollers 58 of which will ride along the rod 59. Similarly, the connected horizontally extending rod 55 will be caused to reciprocate through the sleeve 54.

The egg carrier D has the downwardly projecting arms 67 and 68 clearly shown in Fig. 4. These are slotted at their lower ends to straddle the rods 57 and may be secured thereon by any suitable means. Consequently the egg carrier will move vertically upwardly with the sleeves 38 and 39 and will reciprocate horizontally with the rod 55 passing through sleeve 54, as the former is caused to reciprocate by lever 62 above described. On the other hand the horizontal rod 59 through its rigid connection with the sleeve 38 will merely move upwardly and downwardly, in unison with the horizontal sleeve 54 on sleeve 38, and function as a track positioned to carry and support the rollers 58 of rod 57 as the latter move upwardly with rod 55. It is apparent, therefore, that the egg carrier through the mechanism just described may be raised vertically to the dotted line position shown in Fig. 4, moved horizontally to the right a predetermined distance, lowered to its previous level and moved to the left a predetermined distance. In Fig. 4 the mechanism is shown in position where the egg carrier is in its lowered normal position corresponding with that position where it is designed to move upwardly to receive an egg discharged from the egg chute C onto the pedestal 29.

Eggs placed in the egg chute C are designed to be fed intermittently one by one to be discharged from the chute onto the pedestal 29. This intermittent feeding is accomplished by feed mechanism synchronously operated with the movement of the egg carrier. Pivotally mounted on the frame as at 59 is a stop member in the form of a wire framework 70 (see Figs. 3 and 7) bent in U-shape form so that its lower end will intersect the path of travel of the eggs in the egg chute C. The lower end more particularly illustrated in Fig. 7 is provided with a rubber sleeve 71 or other cushion member. Thus the line of eggs in the egg chute C is stopped from moving towards the discharge end of the chute until stop member 70 is raised.

The raising and lowering of the stop member is controlled by means of a swingable link 72 pivotally mounted from the end chute as at 73 on one side of the stop member as shown in Fig. 7. This pivot link is formed with a lug 74 to which is connected a link rod 75 which passes through the egg chute and pivotally connects at its lower end with a rocking lever 76 pivoted intermediate its ends as at 77, the pivot end being in bearing engagement with a laterally projecting part 78 of a triple armed lever 79. The latter is pivoted as at 80 on the framework of the egg chute and has a downwardly inclined operating arm 81 and an egg feeding control arm 82 just above, the latter having a substantially right angular projection or foot 83 at its opposite end designed during operation to pass upwardly beyond the end of the egg chute and to engage and to be positioned in the path of the lowermost egg about to be discharged from the chute. The third arm 84 of the lever 79 is opposed to arms 81 and 82 and extends between the pivot point 80 and the laterally projecting member 78 which is carried by arm 84.

The operating arm 81 projects forwardly a sufficient distance to pass below the extreme end of rod 59 so that in the vertical reciprocating motion of the rod 59 the operating arm 81 will be engaged and caused to swing on its pivot. In Fig. 3 the egg carrier D is shown in its lowermost position and the rod 59 is correspondingly lowered and in engagement with the control arm 81, thus retaining the foot 83 out of the path of the lowermost egg. At the same time the stop member 70 is in its lowered position stopping the remaining eggs from moving down the chute. When, however, the egg carrier D moves upwardly so as to pick up an egg from the pedestal 29, the rod 59 in moving upwardly also will release control arm 81 and cause the foot 83 to project in the path of the lowermost egg. In moving upwardly the lever 79 swinging upon its pivot lowers arm 84, thus withdrawing member 78 from engagement with the rocking lever 76 and, under pressure of a coil spring 85 positioned between the bed of the egg chute C and lug 74 on link 72, the latter is forced upwardly thus moving stop member 70 upwardly and releasing the lowermost egg. Foot 83 is then in its raised position and such egg is retained by the foot member 83 while the egg previously passed to the pedestal is being carried to this next station by the egg carrier D. It will be apparent, however, that when the egg carrier is again lowered, the engagement between the rod 59 and control arm 81 of lever 79 will withdraw the foot 83 to permit the engaged egg to discharge onto the pedestal 29 while the stop member 70 dropping again to its normal position prevents the balance of the eggs from moving down the chute.

A second stop member 86 (see Figs. 2 and 3) may be positioned on the framework disposed on the opposite side of the egg carrier to that of the cushioned member 71 of stop member 70 to prevent any tendency of an egg discharged onto the pedestal 29 from tipping over and going beyond pedestal 29.

Between each scale pan a guard 87 is mounted (see Figs. 1 and 2). These guards are mounted somewhat similarly to the scale pans by means of gooseneck arms 88 and rigidly fastened from a mounting on the connecting member 14. These guards will engage an egg if it by any chance was dislodged from its position on carrier D and they also serve a further function since either one or both ends is provided with a downwardly projecting lug 89, the side edges of which bend to converge towards each other (see Fig. 10).

Thus, if by any chance, the egg carrier became offset during its upward travel the edges of the lug 89 would serve as a guide or, in other words, form guide means for causing the carrier to move to its normal position without any possibility of it engaging below the scale pans and jambing or interrupting the operation of the machine.

Beyond each end scale pan are mounted rigid guards 90 and 91 respectively. The former avoids any possibility of an egg dropping down through the machine and the latter which, as shown in Fig. 8, is inclined towards the egg tray, serves as a guide member for discharging the lightest eggs into the end compartment of the tray. In other words, those eggs which will not cause the final scale pan to tip will be again picked up by the egg carrier D and, when they engage the guard member 91, on the lowering of the egg carrier, they will be urged into the end compartment of the scale pan B.

At this point it will be useful to describe the general operation of the machine before describing the remaining features of it. In general operation let it be assumed that the scales are graduated so that the heaviest eggs will tip the first scale while the remaining scales will be tipped in progression in accordance with the weight of an egg which may be deposited on them. The apparatus is set in the position as shown in Figs. 1, 2 and 3 and an egg has been deposited on the egg pedestal 29 as shown in Fig. 3. Operation of the motor 53 will, through the drive, operate cam shaft 47 which rotates in an anti-clockwise direction. This will cause cam 46 to rotate in anti-clockwise direction and due to the acute cam rise as shown in Fig. 4 the engaged roller 45, its supporting arms 44 and connected plates 43 together with the plates 40 and 41 connected by rod 42, will be caused to rise. Moreover, since plates 40 and 41 are connected with the sleeves 38 and 39, said sleeves will be caused to rise. As a result, therefore, the horizontal sleeve 54 connected with sleeve 39 and its rod 55, together with horizontal rod 59 connected with the sleeve 38, will rise. The egg carrier D mounted on the rods 57 connected with horizontal rod 55 will likewise rise and the first egg receiving recess in the egg carrier D will lift the egg from the pedestal 29 up to its dotted line position (Fig. 4). At the same time the longitudinal bars 25 and 26 of the egg carrier D will, in effect, straddle the scale pans of the scales, the upper edges of these bars being positioned above the level of the scale pans. Thus, the egg is clear of the top of the scale pans. Simultaneously with this operation, the rising of horizontal bar 59 will release the control arm 81 of lever 79 to cause the foot 83 to project in the path of eggs in the egg chute and will raise stop member 70 to allow the next egg to roll to the edge of the chute to be retained by the foot 83.

During this time the cam 65 has been rotating with its true arc surface against the roller 64 which will not affect lever 62. However, at the point where the egg carrier D has been raised to its upper limit ready for the next operation, the offset cam surface of cam 65 engages roller 64 and causes lever 62 to swing in a smooth motion a predetermined distance to the right as viewed in Fig. 4. The lever 62, through its pivoted connection with the link rod 60, causes the rods 57 carrying the egg carrier D and the connected horizontal rod 55 to move to the right and during this movement the rollers 58 roll along the horizontal bar 59. The egg carrier is, therefore, moved smoothly to the right a predetermined distance which in fact corresponds to the distance between the pedestal 29 and the centre of the scale pan of the first scale. At this point the cam 65 has a uniform curve which maintains the lever 62 in this position. On the other hand, due to the change in curvature of the opposed cam 46 the roller 45 in following this changed curvature causes its connected parts to lower so that the egg carrier D is lowered as the sleeves 38 and 39 slide down their guide rods 34 and 35.

The horizontal bars 24 and 25 of the egg carrier D in moving past the side edges of the scale pans cause the egg to engage scale pan No. 1 where it is received and held in the concaved surface of this pan. If the egg is of the heaviest contemplated, the scale pan will dip, the scale beam 18 swinging on its pivot against its weight 21, as shown in Fig. 5, so that the egg will be caused to roll off the scale pan into the first compartment of the egg tray B. If the egg is not the heaviest contemplated the scale will remain stationary. Let us assume that it is not the heaviest and the scale remains stationary.

The egg carrier D now in its lowermost position is caused to move to the left, as viewed in Figs. 2 and 4, by reason of the cam 65 which changes curvature at this point, causing the lever 62 to move to the left under influence of weighted lever 66 and the cam roller 64 following the changed surface of cam 65. The egg carrier is then returned to its normal position waiting to pick up the next egg on pedestal 29. This next egg is already in position on the pedestal because the control arm 81 of lever 79 was depressed on the downward movement of the egg carrier after depositing the egg on the scale pan, as soon as the horizontal rod 59 moved downwardly and engaged control arm 81. Consequently the foot 83 was withdrawn from the path of the next egg which was then deposited on pedestal 29. The egg carrier continues its cycle of operation picking up the egg from the pedestal 29 and at the same time picking up the egg from the first scale pan so that in its next horizontal movement to the right the egg from the first scale pan is moved over above the second scale pan while the egg just picked up is moved to a position over the first scale pan. Upon the next downward movement of the egg carrier, therefore, these eggs are deposited on the first and second scale pans, causing either one or both to tilt and discharge the eggs in the appropriate compartment of the egg tray B or remaining on the pans to be transferred to the scales beyond for lighter eggs.

In this way the eggs are moved from scale pan to scale pan until they are discharged in their appropriate compartments graduated by weight and any eggs that do not cause any of the scale pans to tilt will be brought into engagement with the guard bar 91 at the end of the frame which will cause such eggs to discharge into the end compartment of the egg tray B.

Following a consideration of the operation, the other details of the invention will now be more fully appreciated. It will be noted that an angular faced rubber cushion 92 is positioned at the inner edge of each compartment of the egg tray B. This functions as a cushion member to avoid any possibility of breakage or damage to the eggs as they transfer from the scale pan to the egg tray. Moreover, it will be appreciated that as a scale pan tips with the weight of an egg the decrease in weight as the egg starts to roll from the pan will cause the scale pan to return to its normal position during which motion it urges the egg cleanly off the pan which is received on the cushion member 92 and transferred immediately to the tray where it rolls down towards its edge. In this instance the inclined face of the cushion 92 assures that the egg will be urged towards the tray.

When the scale returns to its normal position it will be noted that the end of the scale arm 20 projecting beyond the weight 21 is disposed in the path of a cushion member 93 of rubber, for instance, so that this eliminates any shock or any jarring of the scale, thus contributing not only to long life of this part of the apparatus but also avoiding any possibility of noise.

The scale mountings and the arms 20 and weights 21 of the scales are housed within a casing 94, the forward face of which is downwardly inclined or curved as shown clearly in Fig. 3 which terminates below the level of the bars 25 and 26 of the egg carrier D. On each end of the casing 94 there is provided a pan 95 and 96 respectively, on the level substantially corresponding to the lowest level of the upper part of the egg carrier D. The pan 95 serves to receive eggs, if by chance they should be moved out of position when being initially fed into the machine and locates them handily to the operator so that they can be returned to the egg chute C. The pan 96 serves to receive the eggs which for any possible reason may have become dislodged during their passage through the machine on the egg carrier D. For instance, suppose that an egg was dislodged in its passage on the egg carrier, it would lodge against the curved or inclined face of the casing 94 and bar 26 of the egg carrier D. It would then remain in this position being urged along through the machine as the egg carrier reciprocates to the right and finally would be deposited in pan 96. The action is such that the eggs that might be so dislodged are gently handled and finally may be removed from pan 96 to be returned to the egg chute C for regrading. It might be noted that if there was a tendency for the egg to move towards the egg tray B when it reached the end of casing 94, contact of the egg with the inner edge of guard 91 would positively urge it towards pan 96.

It will be noted that the egg tray B is pivotally mounted at one end on a bracket 97. It is also pivotally mounted at the other end to the wall of egg chute C by a simple bolt connection, not shown. Beyond this pivot at the front face of the framework it is supported on a horizontal bar 97a which, as shown in Fig. 2, is carried on adjustable brackets 98. Thus, by raising or lowering the brackets 98 the degree of inclination of the egg tray may be determined.

By reason of the fact that the cams have ground surfaces and since the weighted lever 66 always maintains contact between roller 64 and cam 65 apart from the fact that the egg carrier is firmly supported for vertical and horizontal movement, such as by the rollers 58 bearing against rod 59, it will be appreciated that the machine will operate smoothly thereon and substantially silently. Not only are the moving parts substantially silent but the smooth movement functions to deposit the eggs on the pans of the scales in a simple operation which lends to silence in addition to handling the eggs gently.

While the machine has been described in relation to its special functions, viz. egg grading, it will be appreciated that it may be employed for grading other products that can be graded by weight.

What we claim is our invention is:

1. A grading machine for eggs or the like comprising a frame, a plurality of scales on said frame spaced apart from one another, each having a scale pan aligned with that of adjacent scales, said pans being located in a path disposed intermediate the longitudinal side edges of said frame, egg carrying means located along said path and designed to straddle said scale pans during movement, said egg carrying means being designed to transfer eggs from pan to pan, means for feeding eggs or the like to the egg carrying means, means for moving the latter horizontally to position an egg over a scale pan, vertically downward to deposit an egg on the pan and horizontally backward and vertically upward to initial egg receiving position, said means including spaced apart guides, support means reciprocable in said guides adapted to raise and lower bearing means, the latter designed slidably to support said carrier, driving means on said frame, cam means in connection with said driving means cooperatively engageable with an arcuate member pivotally mounted at one end on said frame, the opposite end of said member being pivotally secured to said carrier to impart horizontal reciprocatory movement thereto successively to the intermittent vertical reciprocation of the said support means, guard means on one side of the path spaced from said egg carrying means a distance less than the width of an egg and extending substantially the length of the path of travel of said eggs, said guard means forming with said egg carrying means, a means for supporting eggs dislodged from the egg carrying means, such dislodged eggs being supported and guided through the machine under momentum of the operating carrying means, receiving means for dislodged eggs positioned at the end of the machine beyond said guard means and means on the opposite side of said path for receiving eggs discharged from each scale, said latter receiving means including an inclined tray having an edge positioned directly adjacent to the scale pans and a cushioning member carried along said edge of the tray for initially receiving discharged eggs or the like.

2. A grading machine for eggs or the like as claimed in claim 1 in which the inclined tray is pivotally mounted on the frame at its inner end and adjustably supported on the tray towards its outer end for adjusting the inclination of the tray.

3. A grading machine for eggs or the like comprising a frame, a plurality of scales on said frame spaced apart from one another, each having a scale pan aligned with that of adjacent scales, egg carrying means for transferring eggs from pan to pan, means for feeding eggs or the like to the egg carrying means, means for moving the latter horizantally to position an egg over a scale pan, vertically downward to deposit an egg on the pan and horizontally backward and vertically upward to initial egg receiving position, said means including spaced apart guides, support means reciprocable in said guides adapted to raise and lower bearing means, the latter designed slidably to support said carrier, driving means on said frame, cam means in connection with said driving means cooperatively engageable with an arcuate member pivotally mounted at one end on said frame, the opposite end of said member being pivotally secured to said carrier to impart horizontal reciprocatory movement thereto successively to the intermittent vertical reciprocation of the said support means, means at one end of said frame for feeding eggs into said egg receiving position, an egg receiving tray opposite said egg feeding means for receiving eggs inadvertently dislodged in feeding, an egg receiving tray at the opposite end of the frame for receiving eggs dislodged from the carrying means, a casing covering a portion of said scales and extending between said opposed trays, said casing having a forward wall positioned directly adjacent to the egg carrying means but spaced therefrom a distance less than the width of an egg to form with said egg carrying means a means for supporting eggs dislodged from the carrier, such dislodged eggs being guided by the egg carrying means and said casing wall under momentum of the operating carrying means to said latter egg tray, and an inclined tray positioned along the opposite side of said egg carrying means and having an edge positioned directly adjacent to the scale pans for receiving eggs discharged by said scale pans.

4. A grading machine for eggs or the like comprising a frame, means on the said frame for feeding eggs or the like into said machine, a plurality of scales on the said frame spaced apart from one another and each having a scale pan aligned with that of adjacent scales, means for transferring eggs or the like from scale pan to scale pan including a carrier, a carriage supporting said carrier, the said carriage including spaced apart guides, support means reciprocable in said guides adapted to raise and lower bearing means, the latter designed slidably to support said carrier, driving means on said frame, cam means in connection with said driving means cooperatively engageable with an arcuate member pivotally mounted at one end on said frame, the opposite end being pivotally secured to said carrier to impart horizontal reciprocatory movement thereto successively to the intermittent vertical reciprocation of the said support means, said egg feeding means including a retaining member intermittently moved in the path of eggs or the like fed into the machine, said retaining member being normally held in the path of the eggs and means in connection with said retaining member for causing it to be engaged by said vertically movable rod to remove it from the path of the eggs upon downward movement of said rod.

5. An egg grading machine as claimed in claim 4, in which a stop member is designed to engage the second foremost egg or the like being fed to the machine, said stop member being normally withheld from the path of the eggs or the like and means in connection with said retaining member for causing said stop member to engage the second foremost egg or the like when said retaining member is moved from the path of the first egg or the like.

6. In a machine for grading eggs and the like having a plurality of weighing scales, a longitudinally moving egg carrier designed to move eggs into engagement with said weighing scales, means for moving the said carrier alternately in a vertical direction and in a horizontal direction, said means including spaced apart guides, support means reciprocable in said guides adapted to raise and lower bearing means, the latter designed slidably to support said carrier, driving means on said frame, cam means in connection with said driving means cooperatively engageable with an arcuate member pivotally mounted at one end on said frame, the opposite end of said member being pivotally secured to said carrier to impart horizontal reciprocatory movement thereto successively to the intermittent vertical reciprocation of said support means, a stationary guard member disposed parallel to said egg carrier on one side thereof and spaced apart therefrom laterally a distance less than the width of the article being weighed, and extending substantially the length of the path of travel of the said eggs, said guard member forming, with the egg carrier, means for supporting articles dislodged from the carrier, and egg receiving means disposed along the opposite side of said carrier and designed to receive eggs discharged from said scales.

7. A device as claimed in claim 6, in which the guard member is sloped downwardly toward the egg carrier.

8. In a machine for grading eggs or the like, having a plurality of weighing scales, a longitudinally moving egg carrier designed to move eggs into engagement with said weighing scales, including spaced apart guides, support means reciprocable in said guides adapted to raise and lower bearing means, the latter designed slidably to support said carrier, driving means on said frame, cam means in connection with said driving means cooperatively engageable with an arcuate member pivotally mounted at one end on said frame, the opposite end of said member being pivotally secured to said carrier to impart horizontal reciprocatory movement thereto successively to the intermittent vertical reciprocation of the said support means, a stationary guard member disposed parallel to said egg carrier along one side thereof and spaced apart therefrom laterally a distance less than the width of the article being weighed, and extending substantially the length of the path of travel of said eggs, said guard member forming, with the egg carrier, means for supporting articles dislodged from the carrier, and a receiver at each end of said member, one designed to receive articles dislodged from the said carrier in advance of the guard member, the other designed to receive articles dislodged from the carrier and carried through the machine between said carrier and guard member, and egg receiving means disposed along the side of said carrier opposite that carrying the guard and said end compartment, designed to receive eggs discharged from said scales.

9. A grading machine for eggs or the like comprising a frame, a plurality of scales on said frame spaced apart from one another, each having a scale pan aligned with that of adjacent scales, an egg carrying means for transferring eggs from pan to pan including a pair of spaced apart members disposed to straddle the pans and movable in a horizontal and vertical direction relatively to the pans, a carriage for said egg transferring means including a vertically and horizontally movable member, said carriage having grooved guide rollers connected thereto and a vertically movable track member parallel to said vertically and horizontally movable member engageable by said rollers of the carriage to guide the latter in slidable relation regardless as to the vertical location of said carriage, and means for causing the one member to move vertically and horizontally and the other member to move vertically.

JOHN STEWART CAMPBELL.
WILLIAM BROWN.
GEORGE ALEXANDER DOUGLAS.